Jan. 14, 1969   J. PRICE   3,421,661
CYLINDRICAL FLUID STORAGE AND EXPULSION APPARATUS
Filed Jan. 26, 1968
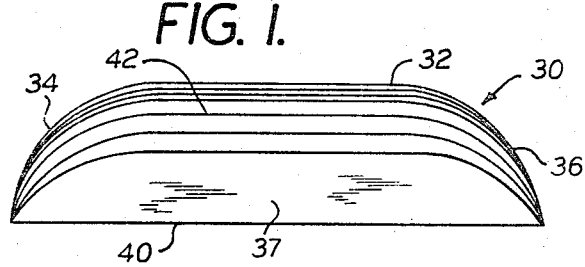
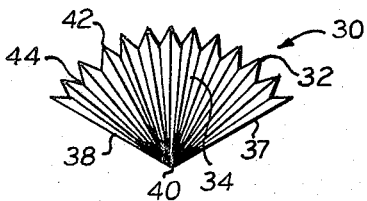
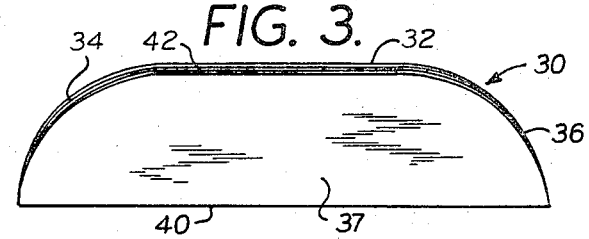
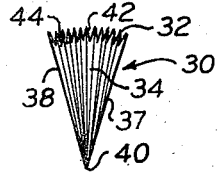
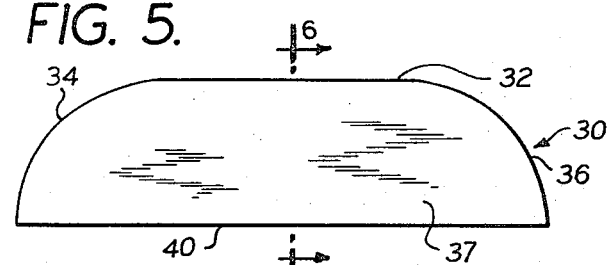
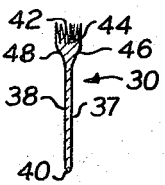
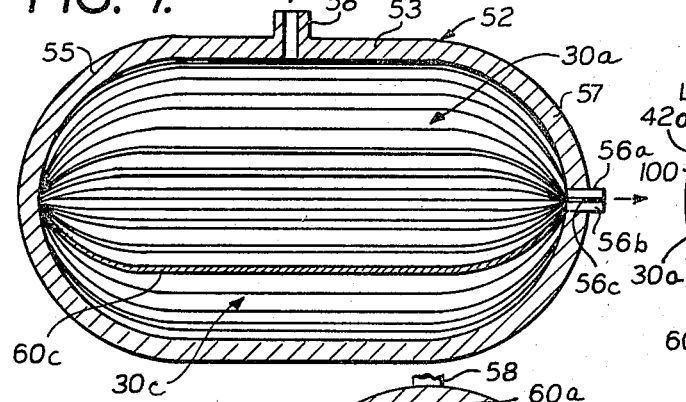
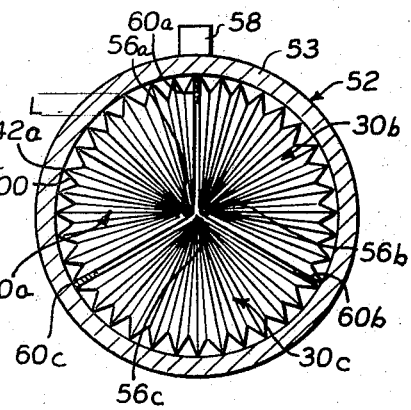
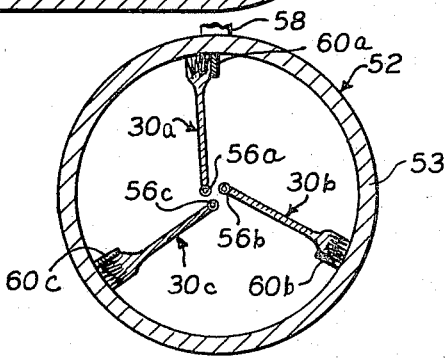
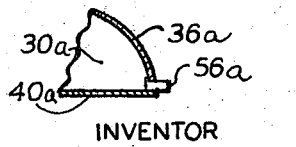
INVENTOR
JOSEPH PRICE
BY Hubbell Cohen & Stiefel
ATTORNEYS.

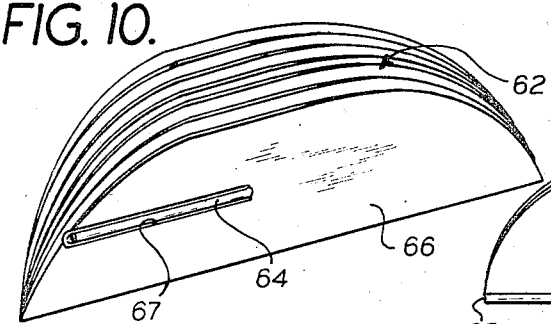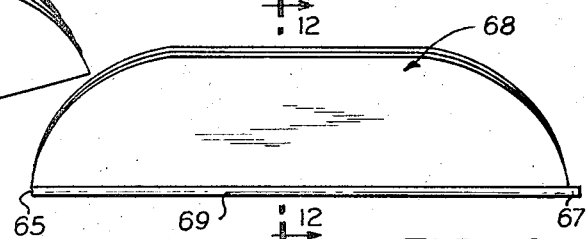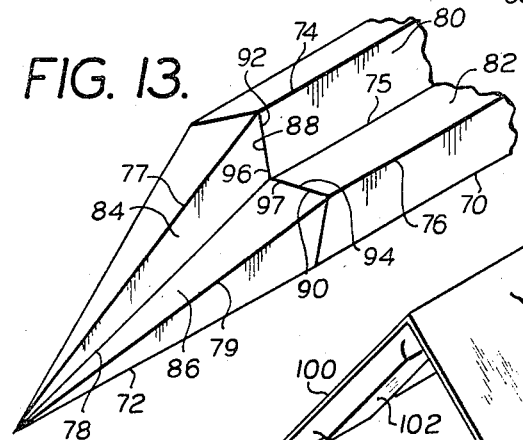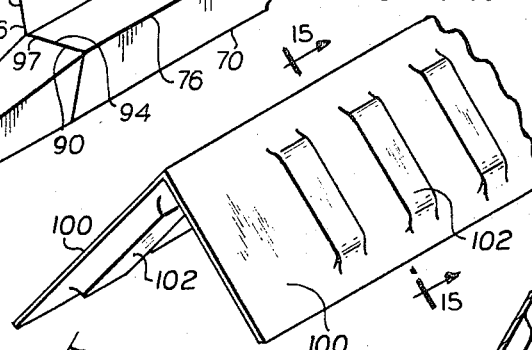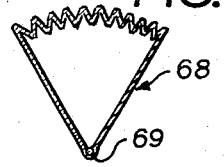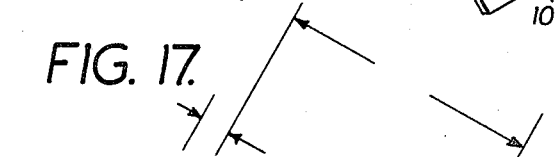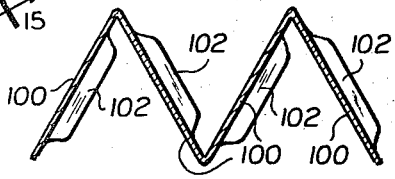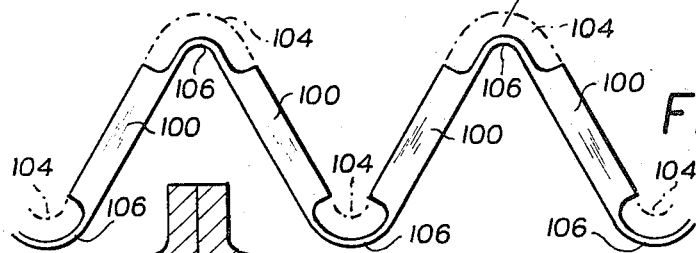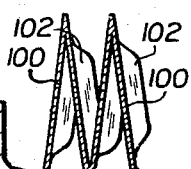

United States Patent Office 3,421,661
Patented Jan. 14, 1969

3,421,661
CYLINDRICAL FLUID STORAGE AND
EXPULSION APPARATUS
Joseph Price, Fairlawn, N.J., assignor to ArJe, Inc.,
Paramus, N.J., a corporation of Delaware
Continuation-in-part of application Ser. No. 606,980,
Jan. 3, 1967. This application Jan. 26, 1968, Ser.
No. 710,419
U.S. Cl. 222—94    30 Claims
Int. Cl. B65d 35/22

ABSTRACT OF THE DISCLOSURE

Fluid storage and expulsion apparatus comprising a generally cylindrical bladder tank containing one or more metallic bladders of generally cylindrical or cylindrical sector form, each bladder having a peripheral wall which is circumferentially collapsible and expandable along predetermined longitudinally extending fold lines. In one form, fluid stored within the interior of the bladders is discharged by causing the bladders to collapse, as by pressure within the tank. In another form, fluid stored within the generally cylindrical tank but exteriorly of the bladders is discharged by causing the bladders to expand, as by inflating the bladders.

*Cross-references to related applications*

This is a continuation-in-part of my copending application now abandoned Ser. No. 606,980, filed Jan. 3, 1967, for Fluid Storage and Expulsion Bladders.

BACKGROUND OF THE INVENTION

*Field of the invention*

This invention relates to new and improved fluid storage and expulsion apparatus and, more particularly, to multicyclicable bladder tanks of generally cylindrical shape.

DESCRIPTION OF THE PRIOR ART

The use of bladder-type fluid storage and expulsion systems which comprise an expulsion bladder or liner operatively positioned within a bladder tank and expandable or collapsible therewithin to expel a contained fluid is known in the prior art. A significant problem of such prior art systems is that the expulsion bladders or their liners are generally not satisfactory for multicycle use. That is, they tend to collapse in disorganized fashion, buckling or folding over and, in some instances, snagging and rupturing, thereby making it impractical if not impossible to obtain satisfactory multicycling. Thus, such systems are of severely limited utility when multicycling capability is desirable, e.g., in space vehicles. A difficulty presented by the use of prior art systems which are satisfactorily multicyclable is that the expulsion bladders do not, in many instances, collapse to a sufficient extent relative to their initial volumes and thus fail to provide high volumetric efficiency, which is greatly desirable when both the weight and space of the apparatus should be kept to a minimum. Thus, the use of such prior art systems in, e.g., the storage and supply of liquid fuel to a rocket propulsion system or fuel cell of a space vehicle would require the on-board maintenance of an unexpellable quantity of the said liquid fuel, with attendant waste of both the space available in the vehicle and load carrying capacity.

These problems are aggravated when the stored fluid has properties which make elastomeric materials unsuited for the collapsible bladder, such as when cryogenic liquids are being stored. In such instances, metallic bladders are usually required, and the problems involved in achieving an orderly, efficient collapse and expansion cycle are multiplied. Thus, although fluid storage and expulsion bladders constructed of elastomeric materials and capable of satisfactory multicycling are available, they are not satisfactory for use with cryogenic fluids because the elastomeric materials become brittle and crack at cryogenic temperatures. In addition, these elastomeric bladders are not satisfactory for use with corrosive fluids which eat away the material to result in bladder failure.

Some presently available fluid storage and expulsion systems contain metallic bladders, but such apparatus takes a generally spherical form, whereas a cylinder is often a more satisfactory shape due to the geometry of the environment. However, until the present invention, a satisfactory cylindrical fluid storage and expulsion system, and especially one with a metallic bladder, was unavailable. Prior art devices were either unduly heavy, or had poor expulsion efficiency, or contained elastomeric bladders which are of limited application, or had a combination of such shortcomings. Moreover, many of such prior art cylindrical devices were severely limited in the configurations of the head ends of the tank and bladders.

SUMMARY

My invention comprises a fluid storage and expulsion system of generally cylindrical form which includes a metallic bladder having a circumferentially collapsible or expandable peripheral wall of cylindrical or cylindrical sector form. The preferred embodiments of the fluid storage and expulsion apparatus of this invention include a substantially cylindrical tank in which are disposed several expandable and collapsible bladders which, when expanded, occupy substantially the entire tank interior. The bladders are constructed of metallic materials and take the form of cylindrical sectors, each of which has a peripheral wall which forms at least a portion of a cylinder and constitutes a bladder body portion. End wall portions, which preferably but not necessarily form portions of cones, spheres or ellipsoids, are disposed at opposite ends of the peripheral wall or body portion, and generally flat, longitudinally extending side wall portions extend from an axially extending main fold line or vertex throughout substantially the entire length of the body and end portions for enclosing the interior of the bladder. The peripheral wall includes spaced, generally longitudinally extending corrugations which are formed by fold lines or vertices and extend between the side portions throughout substantially the entire length of the peripheral wall and bladder end portions. Thus, the bladder is collapsible, in the nature of a fan, from the expanded condition to the collapsed condition by folding the bladder material along the fold lines or vertices and simultaneously collapsing the peripheral wall and end portions in the circumferential direction.

In one embodiment, a discharge conduit or outlet extends from one or more of the expanded bladders, which are filled with a fluid to be expelled therefrom. Applying pressure on the bladder by supplying a pressurized fluid to the interior of the tank (but exteriorly of the bladders) of sufficient magnitude to cause the stresses at the fold lines or vertices to bend the bladder material thereat, the bladders are caused to collapse in the circumferential direction along the fold lines, thereby expelling fluid contained within the bladders through the discharge conduit.

The bending of the bladder material may occur completely within its elastic range or alternatively may occur partially within its elastic range and partially beyond its flexural yield point to result in plastic bending thereafter. Thus, as used therein, the term "bending" is to be understood to include both bending of the bladder material only within the elastic range thereof and alternatively, bending of the bladder material within the elastic range followed by plastic bending after the bladder material has been stressed beyond its flexural yield point.

Reliable multicycling of the bladder is made possible by the orderly collapse of the bladder along the fold lines and is accomplished by refilling the bladder through the discharge conduit, reexpanding the bladder to substantially its initial, expanded condition for the subsequent recollapse of the bladder along the fold lines or vertices such as described above. Since each bladder always collapses or expands only along its fold lines or vertices, it may be recycled many times without structural failure.

In another embodiment, a discharge conduit extends from a bladder tank filled with a fluid to be expelled therefrom. Also within the tank are one or more collapsed bladders of the construction already described, which may be caused to expand by supplying a pressurized fluid through one or more pressurized fluid inlet conduits communicating with the interior of the bladders. When the pressure inside the bladders is sufficient to overcome both the pressure of the fluid stored in the tank and the resistance to bending of the bladder material, the bladders expand along the fold lines or vertices. Upon expansion, the bladders occupy a greater volume within the tank and momentarily cause the pressure in the tank to increase, thereby tending to expel the fluid stored in the tank through a discharge conduit.

BRIEF DESCRIPTION OF THE DRAWINGS

FIG. 1 is a side-elevational view of a currently preferred form of corrugated expulsion bladder constructed in accordance with this invention, said bladder being in its expanded condition;

FIG. 2 is an end view of the corrugated expulsion bladder of FIG. 1;

FIG. 3 is a side-elevational view of the corrugated expulsion bladder of FIG. 1 in a partially collapsed condition;

FIG. 4 is an end view of the expulsion bladder of FIG. 3;

FIG. 5 is a side-elevational view of the corrugated expulsion bladder of FIG. 1 in the fully collapsed and over pressured condition;

FIG. 6 is a vertical cross-sectional view taken along lines 6—6 in FIG. 5;

FIG. 7 is a side-elevational view, with parts in section for purposes of illustration, of one form of bladder tank containing a plurality of the corrugated expulsion bladders of FIG. 1;

FIG. 8 is an end-elevation view, with parts in section for purposes of illustration, showing the corrugated expulsion bladders of FIG. 7 in the expanded condition;

FIG. 8A is a vertical cross-sectional view of a portion of one of the corrugated expulsion bladders of FIGS. 7 and 8 illustrating one form of fluid discharge conduit;

FIG. 9 is a view in the nature of FIG. 8 showing the corrugated expulsion bladders in the fully collapsed and over pressured condition;

FIG. 10 is a perspective view of a corrugated expulsion bladder with a different form of fluid discharge conduit;

FIG. 11 is a side-elevational view of a corrugated expulsion bladder including still another form of fluid discharge conduit;

FIG. 12 is a vertical cross-sectional view taken along line 12—12 of FIG. 11;

FIG. 13 is a perspective view of another form of corrugated expulsion bladder constructed in accordance with this invention;

FIG. 14 is a perspective view of a portion of a modified, reinforced corrugated expulsion bladder constructed in accordance with this invention;

FIG. 15 is a vertical cross-sectional view of a somewhat larger portion of the reinforced, corrugated expulsion bladder of FIG. 14 depicted in the open or expanded position;

FIG. 16 is a vertical cross-sectional view of the reinforced, corrugated expulsion bladder of portion FIG. 14 depicted in the partially collapsed condition;

FIG. 17 is a vertical cross-sectional view of a portion of another form of corrugated expulsion bladder constructed in accordance with this invention;

FIGS. 18 through 20 are vertical cross-sectional views illustrating the method of construction, through the use of currently preferred forming means, of a corrugated expulsion bladder of this invention during the various stages of construction;

DESCRIPTION OF THE PREFERRED EMBODIMENTS

Figure 21:
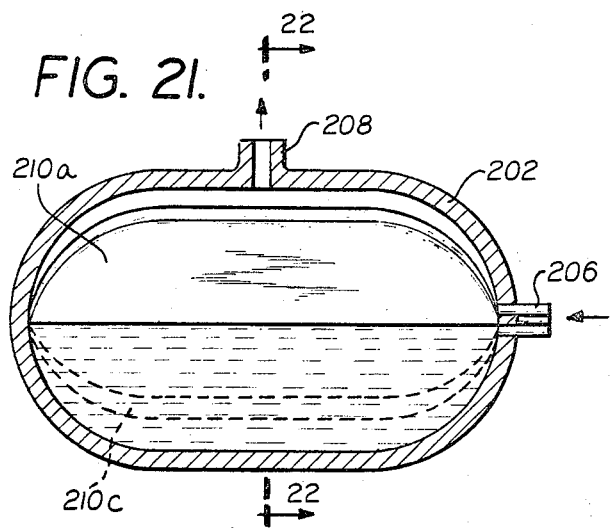
FIG. 21 is a longitudinal sectional view of an alternative form of bladder tank containing a stored fluid and a plurality of the expulsion bladders of FIG. 1 with liquid in the upper half deleted to more clearly illustrate the invention.

Referring now to FIGS. 1 through 6, inclusive, a currently preferred form of corrugated expulsion bladder constructed in accordance with this invention in the form of a cylindrical sector is indicated generally at 30, and comprises a peripheral wall 32 which forms a portion of a cylinder, and end portions 34 and 36 each of which forms a portion of a sphere disposed at opposite ends of the said peripheral wall and smoothly curving away therefrom in the manner best seen in FIG. 1.

Generally flat, longitudinally extending side walls 37 and 38 extend as shown form a generally axially extending main fold line or vertex 40, which forms the central axis of the cylinder, to the peripheral wall 32 and along substantially the entire length of the main fold line. Longitudinally extending corrugations, distributed between side walls 37 and 38, are formed in peripheral wall 32 by fold lines or vertices as indicated at 42 and 44, respectively, and extend throughout substantially the entire length of the peripheral wall and end portions.

Although the cylindrical sector formed by the corrugated expulsion bladder 30 is depicted in FIG. 2 as of approximately 120 degree extent in the fully expanded condition thereof, it is to be understood that the said cylindrical sector may be of lesser or greater angular extent.

The bladder 30 may be constructed of any metal which possess the requisite strength characteristics and is compatible with the fluid to be contained therein, it being noted in this regard that stainless steels of the A.S.A. 300 series have proven particularly satisfactory, and especially in instances wherein the fluids to be stored are at cryogenic temperatures. Alternatively, other relatively readily bendable metals in the nature of copper or aluminum might find satisfactory utilization in the construction of the bladder 30 for some applications of the latter.

The expulsion bladder 30 is designed to collapse or close along the said fold lines 40, 42, and 44 in the nature of a fan, upon the application of external pressure to the bladder of sufficient magnitude to cause the stresses at the fold lines 40, 42 and 44 to bend the material from which the bladder is made at the said fold lines well before stress levels are achieved in the bladder which may cause uncontrolled buckling of any portion of the bladder. These stresses along the fold lines result in the folding of the said portions along main fold line 40 and folding of the said peripheral wall in the circumferential direction along corrugation fold line 42 and 44. This will, of course, cause the expulsion of the fluid contained in the bladder therefrom in the manner described in detail hereinbelow.

FIGS. 3 and 4 illustrate the expulsion bladder 30 in the partially collapsed condition thereof, as a result of the application of the said external pressure to the bladder, at which point a substantial portion of the fluid contained within the said expulsion bladder will have been expelled therefrom. It will be noted that the only deformation of the bladder has taken place at the fold lines 40, 42 and 44, whereby to maintain the collapse orderly and reversible.

FIGS. 5 and 6 illustrate the expulsion bladder 30 after the same has been fully collapsed by the application of the said external pressure thereto, and the said external pressure increased in magnitude to in essence overpressure the expulsion bladder and force the flat side portions 37 and 38 thereof to fold under the now closed corrugations, in the manner indicated at 46 and 48 in FIG. 6, to thus effect the substantially complete expulsion of the fluid contained in the bladder therefrom and provide an excellent expulsion efficiency of close to 100% for the latter. It will be noted that the bending at 46 and 48 is such that no tears or pinholes are likely to result and the nature of the deformation is clearly reversible whereby to permit recycling and consequent reuse of the bladder. The high expulsion efficiency is made clear by FIG. 6 wherein it may readily be seen that the only voids remaining for fluid retention within the expulsion bladder 30, after the latter has been fully collapsed and over pressured, are the small interstices at the fold lines 42 and 44 of the corrugations, and the relatively smal space between the bottoms of the closed corrugations and the now folded in side portions 37 and 38 of the said bladder.

The volumetric efficiency of the expulsion bladder 30 is dependent upon the ratio of the depth of the corrugations to the bladder radius and may be expressed by the formula $$E = 1 - \frac{h}{R}$$

wherein E is equal to the volumetric efficiency, $h$ is equal to the radial depth of the corrugations and R is equal to the outside bladder radius. Thus, for an expulsion bladder of cylindrical sector form having a nine inch radius and a ¼ inch corrugation depth, the volumetric efficiency will be an excellent 97.33%.

Since the corrugation depth adversely affects the volumetric efficiency of the expulsion bladder, the same will preferably be reduced, as the radius R of the expulsion bladder is reduced to thus maintain the volumetric efficiency at a high level despite a reduction in size of the expulsion bladder.

For use in the storage and expulsion of fluids in a fluid storage and expulsion system, a plurality of the corrugated expulsion bladders 30 may be operatively positioned within a bladder tank, as indicated generally at 52, in the nature of a fluid-tight pressure vessel of generally cylindrical configuration as indicated in FIGS. 7 through 9 inclusive. The bladder tank comprises a generally cylindrical body member 53 and end members 55 and 57 disposed at opposite ends thereof to enclose a volume therewithin. It is, of course, most desirable that the respective configurations presented by the bladder tank and plurality of expulsion bladders conform closely so as to provide for maximum utilization of the internal volume of the said bladder tank. This may be readily accomplished by initially designing and constructing the bladders so that the combined configurations thereof conform closely to the configuration of existing, and readily available, pressure vessels in the nature of bladder tank 52, or alternatively, by designing and constructing the latter in accordance with the configuration a desirable form of expulsion bladder.

If the cylindrical sector formed by each of the said corrugated expulsion bladders is of approximately 120° extent in the manner depicted in FIG. 2, three of the said bladders may be operatively positioned within the generally cylindrical bladder tank 52, in the generally side-by-side manner made clear by FIG. 8. Alternatively, if each of the said expulsion bladders is of a different extent, for example approximately 90°, then four rather than three of the said expulsion bladders may of course be positioned within the bladder tank 52; and if the bladders are of 180° extent, then only two will be so positioned. For clarity of description, the three corrugated expulsion bladders which are operatively positioned within the bladder tank 52 are indicated generally at 30a, 30b and 30c respectively, in FIGS. 7 through 9, inclusive.

Each of the expulsion bladders 30a, 30b and 30c includes fluid discharge conduit or outlet means extending therefrom to enable the expulsion of fluid from the respective bladders, and the said fluid discharge conduits are identified as 56a, 56b and 56c, respectively.

The fluid discharge conduits are of the same tubular construction and, as illustrated in FIG. 8A for fluid discharge conduit 56a of corrugated expulsion bladder 30a, are operatively attached to the respective bladders by extending the fluid discharge conduit 56a through an aperture provided therefor in the bladder end portion 36a adjacent the main fold line 40a, and securing the said fluid discharge conduit to the corrugated expulsion bladder 30a in any convenient manner. Thus, the tubular construction of the discharge conduit provides fluid flow communication with the interior of the bladder. Accordingly, it is believed clear that as the three expulsion bladders 30a, 30b and 30c are collapsed by the application of an external pressure thereto which causes the stresses at the fold lines 40, 42 and 44 to bend the bladder material at the said fold lines, expulsion of the said fluid through the respective fluid discharge conduits, 56a, 56b and 56c will result.

To this effect, namely, the provision of the said external pressure, a pressure fluid inlet conduit 58 is provided to extend as shown into the interior of the bladder tank 52 to enable the communication of what may be termed an expulsion fluid to the said container interior. In practice, the expulsion fluid is preferably gaseous and with present bladder designs need only be supplied to conduit 58 at a pressure sufficient to create a 1 to 2 p.s.i. pressure differential between the internal and external pressures acting on the expulsion bladders 30a, 30b and 30c, respectively, in order to collapse the bladders.

Holding means as indicated at 60a, 60b and 60c respectively, may be provided to extend as shown from the interior wall of the bladder tank 52 into contact with the adjacent, radially outer portion of the respective, generally flat bladder side wall portions 37a, 37b and 37c and may be affixed thereto in any convenient manner as by soldering or brazing. The locating means will thus provide, in combination with the respective fluid discharge conduits 56a, 56b and 56c which extend in fluid-tight fashion in the manner made clear by FIG. 7 through apertures provided therefor in the adjacent end member 57 of bladder tank 52, means for locating the respective corrugated expulsion bladders within the container 52, whereby the bladders will reutrn to substantially the positions thereof depicted in FIG. 8 after the same have been fully collapsed and overpressured to expel substantially all of the fluids contained therein, and then reexpanded by refilling for recycling in the manner described in detail hereinbelow. Non-illustrated valve means of conventional construction may of course be provided to control fluid flow through bladder tank fluid inlet conduit 58 and the respective expulsion bladder discharge conduits.

Thus, with the respective bladders 30a, 30b and 30c each substantially full of a fluid under pressure and in the substantially fully expanded condition thereof as depicted in FIGS. 7 and 8, the supply of an expulsion gas at a pressure greater than that of the bladder contained fluids as described above, to the interior of bladder tank 52 through expulsion fluid inlet conduit 58 will result in the orderly collapse of the expulsion bladders by the folding thereof along the respective bladder fold lines as discussed above, with resultant expulsion therefrom through fluid discharge conduits 56a, 56b and 56c of the fluids contained therein. The introduction of an expulsion fluid at even greater pressure than that needed to effect such collapse will result in the overpressuring of the interior of the container 52 with attendant bending of the respective, generally flat bladder side portions, whereupon the respective expulsion bladders will assume the configurations and positions depicted in FIG. 9 and substantially all of the fluids contained therein will have been expelled therefrom for reasons believed made clear hereinabove in the description of FIGS. 5 and 6.

Should it subsequently become desirable to re-expand the respective expulsion bladders by refilling the same with fluids to enable the recycling or reuse thereof the same may be readily effected by in effect depressuring the interior of container 52 through explusion fluid conduit 58, and refilling the interiors of the respective expulsion bladders with fluids under pressure through the use of the respective fluid discharge conduits 56a, 56b and 56c. This will, of course, result in the re-expansion of the respective expulsion bladders by the unfolding thereof along the said fold lines to substantially the positions thereof depicted in FIGS. 7 and 8, it being noted in this regard that the use of proper materials in the construction of the expulsion bladders, as discussed in detail hereinabove, will provide for the substantial re-straightening of the respective bladder side portions to assume the initial, generally flat configurations thereof despite the bending over of the said side portions which resulted from the described overpressurization of the interior of container 52.

A cylindrical sector, corrugated expulsion bladder comprising a different form of fluid discharge conduit is indicated generally at 62 in FIG. 10 and, as seen therein, comprises a fluid discharge conduit 64 which extends as indicated from one of the generally flat side portions 66 of the bladder 62 through a concavity 67 provided therefor in the said side portion. Thus, the fluid discharge conduit 64 will not extend transversely beyond the side portion 66 and would not interfere with the side-by-side positioning of a plurality of the expulsion bladders 62 in a bladder tank in the manner depicted for expulsion bladders 30a, 30b and 30c in FIG. 8.

A cylindrical sector expulsion bladder comprising still another form of fluid discharge conduit is indicated generally at 68 in FIGS. 11 and 12 and comprises an elongated discharge conduit 69 which is formed, as best seen in FIG. 12, as an integral part of the side portions of the bladder 68 and extends generally longitudinally of the expulsion bladder 68 to in essence form the main fold line or vertex thereof. The elongated discharge conduit 69 may be sealed at one extremity of the bladder, as indicated at 65 in FIG. 11, and include a completely enclosed portion, as indicated at 67, which extends from the other extremity of the bladder and through which the bladder-contained fluid is expelled therefrom. Alternatively, the discharge conduit 69 may include completely enclosed portions in the nature of 69 which extend from both extremities of the bladder 68, in non-illustrated but believed readily apparent manner, to thus make possible the concurrent discharge of the bladder-contained fluid from both extremities of the bladder.

Hereinabove, the present invention has been described with respect to an embodiment wherein the fluid is stored within and expelled from the interior of the bladders. In FIGS. 21–26, two alternative embodiments of the present invention are shown, wherein the fluid is stored in the bladder tank exteriorly of the bladders and is expelled from the tank by expanding one or more collapsed bladders within the tank.

Figure 22:
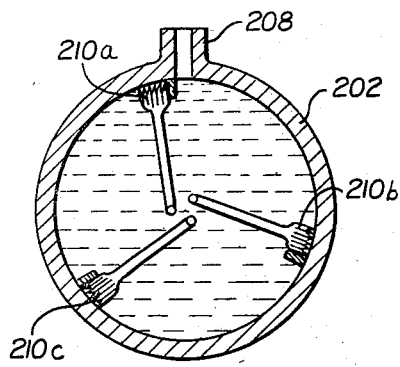
FIG. 22 is a sectional view taken along the line 22—22 of FIG. 21.
Figure 23:
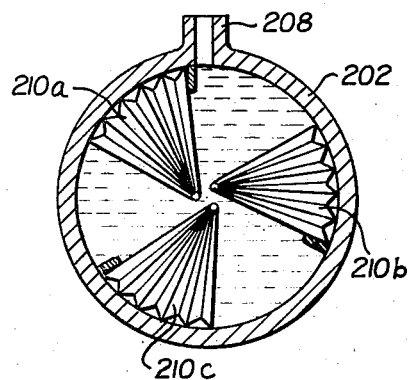
FIG. 23 is a view similar to FIG. 22 wherein the bladders are partially inflated.

In the first alternative embodiment, shown in FIGS. 21–23, bladder tank apparatus similar to that illustrated in FIGS. 7–9 is employed. A bladder tank 202 containing one or more bladders, here shown as the three bladders 210a, 210b, and 210c, is provided with a conduit 208 communicating with the tank interior. In contrast to the conduit 58, show nin FIGS. 7–9, the conduit 208 is a discharge conduit and not a pressurized fluid inlet. Instead, the conduit 206, which communicates with the interior of the bladders 210a, 210b, and 210c, is the pressurized fluid inlet for this embodiment and is thus subdivided into as many portions as there are bladders, namely three. In FIGS. 21 and 22, the fluid stored in the tank 202 is shown as a liquid, but it will be obvious that partially or wholly gaseous material could alternatively be stored. During storage, the bladders 210a, 210b, and 210c are in the collapsed position and occupy a minimum of volume within the bladder tank 202. When it is desired to discharge the fluid from within the tank 202 through the discharge conduit 208, the bladders are inflated from the collapsed condition by introducing a fluid under pressure into the interior of the bladders 210a, 210b, and 210c through the pressure fluid inlet 206. The pressure within the collapsed bladders causes them to expand and thus to occupy a greater volume within the tank 202. The partially expanded bladders 210a, 210b, and 210c displace an equivalent amount of the fluid stored within the tank 202, causing the fluid to be forcibly expelled through the discharge conduit 208. When a sufficient amount of the fluid has been discharged through conduit 208, the source of pressure is disconnected from the pressure fluid inlet 206, as by closing a valve (not shown), which stops the inflation of the bladders. If the bladders 210a, 210b, and 210c have not yet been inflated to the completely expanded condition (shown in FIGS. 2 and 8), the bladders remain in a partially inflated condition, as illustrated in FIG. 23. The pressure fluid may be a gas, as shown in FIG. 23; alternatively it may be a liquid.

When the present apparatus has been operated to substantially empty the tank 202, the bladders 210a, 210b, and 210c are in the fully expanded condition, corresponding to that shown in FIG. 8. However, it is to be noted that the bladders 30a, 30b, and 30c shown in FIG. 8 are filled to capacity with stored fluid, whereas the bladders 210a, 210b, and 210c of the apparatus shown in FIGS. 21–23 would be in the fully expanded condition only when the stored fluid has been substantially expelled from the tank, and the bladders would therefore contain the pressurized fluid.

Recycling of the apparatus shown in FIGS. 21–23 may be readily accomplished by deflating and collapsing the bladders 210a, 210b, and 210c and by refilling the tank 202 with fluid. The two steps may be performed either simultaneously or sequentially. That is, the conduit 208 may be connected to a source of fluid to be stored in the tank 202, and the pressurized fluid conduit 206 may be vented or connected to a discharge pump. Then, by either supplying the fluid for storage under positive pressure or applying a vacuum to the interior of the bladders through the pressurized fluid conduit 206, or by both means, the bladders are caused to collapse in orderly fashion along their fold lines to reassume the initial, deflated condition illustrated in FIG. 22. Alternatively, the bladders may first be deflated, as by pumping the originally pressurized fluid from the bladders through the conduit 206 and permitting atmosphere or other fluid not for storage to enter the tank 202 through the conduit 208. After the bladders are in the fully deflated condition, which is similar to the condition illustrated in FIG. 9, the tank may be filled with a liquid to be stored, displacing the atmospheric or other materials within the tank 202.

Figure 24:
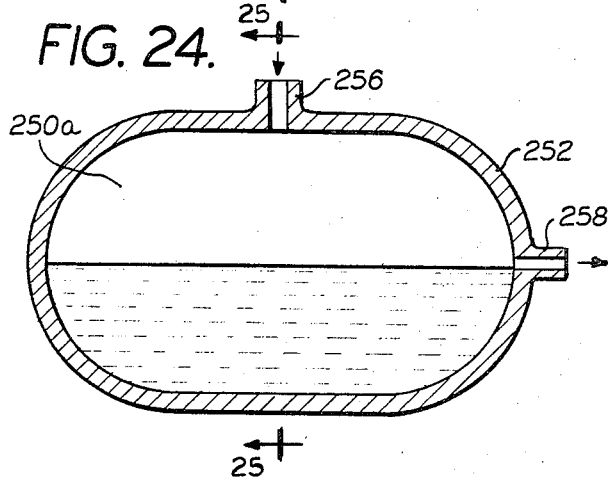
FIG. 24 is a longitudinal sectional view of another alternative form of bladder tank embodying the present invention.
Figure 25:
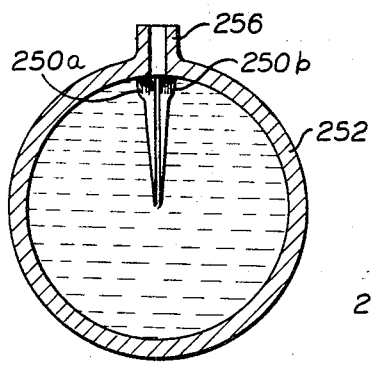
FIG. 25 is a sectional view taken along the line 25–25 of FIG. 24.
Figure 26:
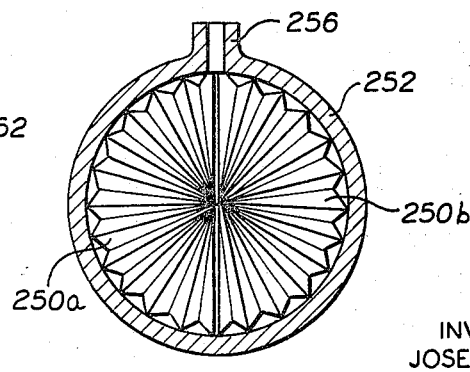
FIG. 26 is a view similar to FIG. 25 wherein the bladders are completely expanded.

Another alternative embodiment is shown in FIGS. 24–26, wherein the stored fluid is similarly within the tank 252 but external of the bladders 250a and 250b. However, the stored fluid discharge conduit 258 communicating with the interior of the tank 252 extends from an end of the tank, and the pressurized fluid inlet 256 communicating with the bladders 250a and 250b extends through the cylindrical wall of the tank 252. The illustrated embodiment has two bladders 250a and 250b, which expand to approximately 180°, as shown in FIG. 26. Alternatively, one 360° bladder could be employed, or more than two bladders could be used, although they would require a plurality of pressurized fluid inlets corresponding to the inlet 256. In the present embodiment, the inlet 256 communicates with the interior of the bladders through the peripheral wall of each bladder. Thus, there is no inlet near the main fold line of each bladder corresponding with the inlet 56a illustrated in FIG. 8A. The operation of the present form of the invention is substantially identical to that of the apparatus of FIGS. 21–23, except, of course, that the pressurized fluid inlet 256 extending from the body of the tank 252 corresponds to the pressurized fluid inlet 206 extending from the end of the tank 202; and similarly the discharge conduit 258 extending from the end of the tank 252 corresponds to the discharge conduit 208 extending from the body of the tank 202. Thus, the inflation of the bladders 250a, and 250b from the collapsed condition shown in FIG. 25 to the fully expanded condition shown in FIG. 26 proceeds continuously through various intermediate, partially inflated positions and may be interrupted at any desired point, as described hereinabove with respect to FIG. 23.

It is to be noted that the alternative embodiments shown in FIGS. 21–23 and FIGS. 24–26 may contain any of the desirable forms and features of bladder described above with respect to FIGS. 1 to 12 and hereinafter with respect to FIGS. 12 to 20, including, among others, the forms of end walls, the nestable stiffeners, the type of conduit (where compatible) extending to the interior of the bladder, the reduced section fold lines, bendable bladder side walls (as in FIG. 6), etc.

Multicycling of the corrugated, expulsion bladders of this invention will be limited primarily by the strain capability of the material from which the same are constructed, and this strain capability will, in turn, probably be a function of two critical design considerations. These critical design considerations encompass both the flexing of the bladder material at the fold lines or vertices of the corrugations, and the discontinuity stresses at the transition between the generally cylindrical body portion of the bladder and the respective end portions thereof.

The discontinuity stresses can best be explained by reference to FIG. 13 wherein is depicted a portion 70 of a cylindrical sector expulsion bladder which also includes an end portion 72 which forms a portion of a cone rather than a portion of a sphere, and corrugations formed as before, by fold lines or vertices 74, 75, 76, 77, 78 and 79, respectively, to provide corrugation surfaces 80, 82, 84 and 86, respectively. As the bladder portion 70 is collapsed, corrugation surfaces 80 and 82 will be rotated toward each other around vertex 75, and corrugation surfaces 84 and 86 will be rotated toward each other around vertex 78 concurrently therewith. Thus, at the vertex 88 of the surfaces 80 and 84, and the vertex 90 of the surfaces 82 and 86, the material from which the expulsion bladder is constructed is required to simultaneously rotate around both vertices 75 and 78, which simultaneous rotation is, of course, impossible. In actual practice, the said material in the areas of the radially outer portions of vertices 88 and 90, as indicated at 92 and 94, is placed in tension to in turn place the said material in the areas of the radially inner portions of the said vertices, as indicated at 96 and 97, in compression. This compression wrinkles the said material in the areas indicated at 96 and 97 to thus permit the collapse of the expulsion bladder through the closing of the corrugations.

The severity of the tensile and compressive stresses depends primarily on the abruptness of the transition between the body portion of the expulsion bladder and the respective end portions thereof. Thus it is believed made clear that an expulsion bladder with end portions which form portions of spheres or ellipsoids which gradually curve away from the general cylindrical body portion in the manner depicted in FIG. 1, will function to reduce significantly the tensile and compressive stresses upon multicycling of the bladder, as compared to an expulsion bladder of the nature depicted in FIG. 13 which includes end portions that are portions of cones, the corrugation surfaces of which intersect sharply with the corrugation surfaces of the generally cylindrical body portion. It is for these reasons that the expulsion bladder end portions are preferably spherical or ellipsoidal portions, with an end portion in conical form illustrated by FIG. 13 primarily to simplify the explanation of the tensile and compressive stress development.

During periods when the corrugated expulsion bladders of the invention are filled with a fluid to be subsequently expelled therefrom, the bladders are of course subjected internally to the vapor pressure of the said fluid. Depending on the nature of the fluid, and the temperature thereof, this internal vapor pressure can, in some instances, approach 150 p.s.i. which is, of course, many times the quite low differential pressure required to collapse the expulsion bladder as described hereinabove. Thus, as best seen in FIG. 8 with regard to expulsion bladder 30a, this internal pressure functions to push the radially outer vertices 42a of the corrugations firmly against the interior wall of the bladder tank 52. Basically, it can be considered that each corrugation surface of side as indicated at 100 in FIG. 8 of each corrugation acts more or less like a fixed end beam, whereby the maximum moment M per unit width of beam may be determined as $$M = \frac{1}{12} pL^2$$

where L equals the width of the corrugation side, $t$ equals the thickness thereof, and $p$ equals the internal bladder pressure.

Since the section modules is $1t^2/6$, the maximum stress S may be determined as $$S = \frac{1}{2} p \frac{L^2}{t}$$

Thus, since $L/t$ has been found in practice to vary from 50 to 100, depending upon bladder design, the beam stress caused in each of the corrugation sides 100 by an internal bladder pressure of 150 p.s.i. will be in the order of $$S = \frac{1}{2} \times 150 \times 50^2 = 187,500 \text{ p.s.i.}$$

In most instances, stresses of this magnitude will be beyond the yield point of the materials from which the expulsion bladder is constructed, particularly since the said materials must be capable of being bent sharply at the corrugation vertices.

Several means have been devised to reduce these stresses below the yield point of the bladder materials in order to prevent a loss of corrugations and the resultant loss of orderly collapsibility and recycling capability. As illustrated by FIG. 14, one such method comprises the cross-rippling as indicated at 102, of the corrugation sides 100 to thus increase the effective section modulus of each of the said corrugation sides and reduce the hereinabove analyzed bending stresses to approximately 60,000 p.s.i. without significant adverse effect on the flexing of the bladder materials at the corrugation vertices. Preferably, the said cross-ripples will extend, interiorly and exteriorly, as shown, from corresponding locations on adjacent corrugation sides 100 so that the same will nest within each other when the expulsion bladder is collapsed from the expanded condition thereof depicted in FIG. 15 through the partially collapsed position thereof depicted in FIG. 16, in which latter figure the said cross-ripples are, of course, shown in a partially nested condition, to a fully collapsed position in which the cross-ripples are fully nested one within the other (not shown).

Alternatively, the stresses resulting from vapor pressure may be reduced below the yield point of the bladder materials by reducing the ratio L/t through the use of thicker bladder materials in the construction of the expulsion bladders, and the subsequent thinning of the areas of the vertices by conventional procedures, such as, for example, chemical milling. This is believed clearly illustrated by FIG. 17 wherein may be seen that the initial thickness of the bladder material in the area of the vertices, as indicated by the phantom lines 104, may be reduced as by chemical milling through the use of a suitable etchant to the thickness indicated at 106. This chemical milling of the areas of the vertices may be conveniently effected by masking with a resist the portions of the corrugation sides 100 which it is not desired to reduce in thickness, and applying the etchant to the corrugation surface portions which remain exposed.

Once this has been accomplished, the corrugation vertices function in the manner of hinges and the corrugation sides 100 function in the manner of pin-ended beams. In this case, the maximum moment may be determined as $M = \frac{1}{8} pL^2$.

The section modulus remains the same as above at $\frac{1}{6} p^2$, but not the maximum stress S at the center of each of the corrugation sides is determined as $$S = .75p \frac{L^2}{t}$$

Taking a typical case wherein L equals $\frac{5}{16}''$, t equals $\frac{1}{64}''$, the stress S becomes $$S = .75 \times 150 \times (20)^2 = 45,000 \text{ p.s.i.}$$

Thus, it is believed clear that the utilization of either of the above described cross-rippled, or increased thickness, corrugation side constructions will, through the reduction of the stress S, enable the construction of corrugated expulsion bladders which are capable of withstanding high internal vapor pressures of the order of 150 p.s.i., notwithstanding the fact that the said bladders are constructed from materials which are capable of being bent sharply at the respective corrugation vertices.

A currently preferred method of constructing the corrugated expulsion bladders of the invention is illustrated by FIGS. 18–20 inclusive and as seen therein, comprises the use of generally conventional, segmented forming apparatus indicated at 110 which comprises an internal cavity 112 which closely conforms to the desired exterior shape of the finished corrugated expulsion bladder. In the formation of the latter, an uncorrugated preform 114, preferably previously fabricated as by welding, is placed in the die cavity 112 as indicated in FIG. 18.

A first forming pressure is then applied in any convenient manner, as for example through the use of the opening which will subsequently house the expulsion bladder fluid discharge conduit, to the interior of the said preform 114 to result in the partial formation of the corrugated expulsion bladder therefrom as depicted in FIG. 19. This partial formation may be described as the "first stretch."

A final forming pressure is subsequently applied to the interior of the now partially corrugated preform 114 to accomplish what may be termed a "second stretch," and substantially complete the formation of the corrugations on the preform 114 in the manner made clear by FIG. 20. In general, the formation of the bladder corrugations will require the stretching of the preform surface portions which form the same through approximately 40 percent of the initial extent thereof. In this regard, it is noted that the materials in the nature of stainless steels of the A.S.A. 300 series which have proven compatible with many of the fluids to be contained in the completed expulsion bladder, may be satisfactorily prepared for stretching to this 40 percent extent through the use of conventional techniques for in-process annealing. The segmented construction of the die 110 provides for the convenient removal of the corrugated expulsion bladder therefrom as should be obvious.

While the instant invention has been disclosed with reference to several embodiments, it is to be appreciated that the invention is not to be taken as limited to all of the details thereof as modifications and variations thereof may be made without departing from the spirit or scope of the invention.

What is claimed is:

1. A fluid storage and expulsion system which includes a tank, an improved bladder within said tank, said bladder being made of a metallic material and comprising a peripheral wall forming a portion, at least, of a cylinder and a pair of side walls, said peripheral wall having a pair of longitudinally extending endmost elements, said side walls being mutually connected at one end along a fold line coextensive with the central axis of said cylinder and each connected respectively to one of said endmost elements of said peripheral wall, collapsible end walls connected to said side walls and said peripheral wall for enclosing the interior of said bladder, a first conduit extending from outside said tank to the interior thereof but outside of said bladder, a second conduit extending from outside said tank to the interior of said bladder, said peripheral wall having a plurality of longitudinally extending corrugations to provide a plurality of additional fold lines along which bending will take place concomitantly with bending along said axial fold line to collapse said bladder when the difference between the fluid pressure within said tank but outside of said bladder and the fluid pressure within said bladder is of sufficient magnitude to cause the stress along said fold lines to bend the bladder material, and to expand said bladder when the difference between the fluid pressure within said bladder and the fluid pressure within said tank but outside of said bladder is of sufficient magnitude to cause the stress along said fold lines to bend the bladder material.

2. A fluid storage and expulsion system as in claim 1, wherein said second conduit extends into the area of one of said bladder end walls adjacent said main fold line.

3. A fluid storage and expulsion system as in claim 1, wherein said second conduit extends into one of said bladder side walls.

4. A fluid storage and expulsion system as in claim 3, wherein said one of said bladder side walls comprises a generally longitudinally extending concavity formed therein, and said second conduit extends into said side wall and through said concavity.

5. A fluid storage and expulsion system as in claim 1, wherein said bladder end portions curve away from said peripheral wall toward said main fold line.

6. A fluid storage and expulsion system as in claim 5, wherein each of said end walls forms a portion, at least, of a sphere.

7. A fluid storage and expulsion system as in claim 5, wherein each of said end walls forms a portion, at least, of an ellipsoid.

8. A fluid storage and expulsion system as in claim 1, wherein said bladder side walls are generally flat.

9. A fluid storage and expulsion system as in claim 8, wherein said bladder side walls are bendable over said corrugations after the collapse of the bladder and attendant folding of said corrugations along said corrugation fold lines.

10. A fluid storage and expulsion system as in claim 1, wherein the surfaces of said corrugations of said peripheral wall of said bladder are reinforced by the formation of cross-ripples therein, said cross-ripples in adjacent corrugation surfaces being nestable, one within the other, upon collapse of said bladder and attendant folding of said corrugations.

11. A fluid storage and expulsion system as in claim 1, wherein the material from which said bladder is constructed is of relatively reduced thickness in the areas of said corrugation fold lines.

12. A fluid storage and expulsion system as in claim 8, wherein said tank comprises a cylindrical wall and end members, and wherein there are disposed within said tank the number $n$ of said bladders, wherein the sides of each bladder intercept an angle equal to $360/n$ degrees when the bladders are in their expanded conditions and said sides are in substantially surface-to-surface relation with the sides of an adjacent bladder in said expanded condition, and $n$ is an integer greater than one.

13. A fluid storage and expulsion system as in claim 12, wherein said bladder tank end members and said bladder end portions curve away from said bladder tank cylindrical wall and bladder peripheral wall, respectively.

14. A fluid storage and expulsion system as in claim 13, further comprising locating means cooperatively associated with said bladder tank and each of said bladders for fixing one side wall of each of said bladders relative to said bladder tank.

15. In a fluid storage and expulsion system which includes a tank having an inlet for pressurized fluid, the improvement comprising a bladder within said tank, said bladder being made of a metallic material and comprising a peripheral wall forming a portion, at least, of a cylinder and a pair of side walls, said side walls being mutually connected at one end along a fold line coextensive with the central axis of said cylinder and each connected to one of said endmost elements of said peripheral wall, said peripheral wall having a plurality of longitudinally extending corrugations to provide a plurality of additional fold lines along which bending will take place concomitantly with bending along said axial fold line to collapse said bladder when the fluid pressure within said tank and outside said bladder is of sufficient magnitude to cause the stress along said fold lines to bend the bladder material, collapsible end walls connected to said side walls and said peripheral wall for enclosing the interior of said bladder, and outlet means for said bladder.

16. A fluid storage and expulsion system as in claim 15, wherein said bladder end portions curve away from said peripheral wall toward said main fold line.

17. A fluid storage and expulsion system as in claim 16, wherein each of said end walls forms a portion, at least, of a sphere.

18. A fluid storage and expulsion system as in claim 16, wherein each of said end walls forms a portion, at least, of an ellipsoid.

19. A fluid storage and expulsion system as in claim 15, wherein said bladder side walls are generally flat.

20. A fluid storage and expulsion system as in claim 15, wherein the surfaces of said corrugations of said peripheral wall of said bladder are reinforced by the formation of cross-ripples therein, said cross-ripples in adjacent corrugation surfaces being nestable, one within the other, upon collapse of said bladder and attendant folding of said corrugations.

21. A fluid storage and expulsion system as in claim 19, wherein said tank comprises a cylindrical wall and end members, and wherein there are disposed within said tank the number $n$ of said bladders, wherein the sides of each bladder intercept an angle equal to $360/n$ degrees when the bladders are in their expanded conditions and said sides are in substantially surface-to-surface relation with the sides of an adjacent bladder in said expanded condition, and $n$ is an integer greater than one.

22. A fluid storage and expulsion system as in claim 21, wherein said bladder tank end members and said bladder end portions curve away from said bladder tank cylindrical wall and bladder peripheral wall, respectively.

23. A fluid storage and expulsion system which includes a tank, an improved bladder within said tank, said bladder being made of a metallic material and comprising a peripheral wall forming a portion, at least, of a cylinder and a pair of side walls, said peripheral wall having a pair of longitudinally extending endmost elements, said side walls being mutually connected at one end along a fold line coextensive with the central axis of said cylinder and each connected respectively to one of said endmost elements of said peripheral wall, collapsible end walls connected to said side walls and said peripheral wall for enclosing the interior of said bladder, an outlet extending from outside said tank to the interior thereof but outside of said bladder, an inlet for pressurized fluid extending from outside said tank to the interior of said bladder, said peripheral wall having a plurality of longitudinally extending corrugations to provide a plurality of additional fold lines along which bending will take place concomitantly with bending along said axial fold line to expand said bladder when the difference between the fluid pressure within said bladder and the fluid pressure within said tank but outside of said bladder is of sufficient magnitude to cause the stress along said fold lines to bend the bladder material.

24. A fluid storage and expulsion system as in claim 23, wherein said bladder end portions curve away from said peripheral wall toward said main fold line.

25. A fluid storage and expulsion system as in claim 24, wherein each of said end walls forms a portion, at least, of a sphere.

26. A fluid storage and expulsion system as in claim 24, wherein each of said end walls forms a portion, at least, of an ellipsoid.

27. A fluid storage and expulsion system as in claim 23, wherein said bladder side walls are generally flat.

28. A fluid storage and expulsion system as in claim 23, wherein the surfaces of said corrugations of said peripheral wall of said bladder are reinforced by the formation of cross-ripples therein, said cross-ripples in adjacent corrugation surfaces being nestable, one within the other, upon collapse of said bladder and attendant folding of said corrugations.

29. A fluid storage and expulsion system as in claim 27, wherein said tank comprises a cylindrical wall and end members, and wherein there are disposed within said tank the number $n$ of said bladders, wherein the sides of each bladder intercept an angle equal to $360/n$ degrees when the bladders are in their expanded conditions and said sides are in substantially surface-to-surface relation with the sides of an adjacent bladder in said expanded condition, and $n$ is an integer greater than one.

30. A fluid storage and expulsion system as in claim 29, wherein said bladder tank end members and said bladder end portions curve away from said bladder tank cylindrical wall and bladder peripheral wall, respectively.

References Cited

UNITED STATES PATENTS

| | | | |
|---|---|---|---|
| 3,097,766 | 7/1963 | Biehl et al. | 222—95 X |
| 3,158,296 | 11/1964 | Cornelius | 222—386.5 |
| 3,202,326 | 8/1965 | Young | 222—386.5 |
| 3,300,102 | 1/1967 | Budzich | 222—386.5 |

ROBERT B. REEVES, *Primary Examiner.*

NORMAN L. STACK, *Assistant Examiner.*

U.S. Cl. X.R.

222—95, 145